US010416665B2

(12) United States Patent
Park et al.

(10) Patent No.: US 10,416,665 B2
(45) Date of Patent: Sep. 17, 2019

(54) VEHICLE REMOTE CONTROL METHOD, AND VEHICLE AND MOBILE COMMUNICATION TERMINAL THEREFOR

(71) Applicants: Hyundai Motor Company, Seoul (KR); Kia Motors Corporation, Seoul (KR)

(72) Inventors: Yunjoong Park, Seoul (KR); Sung Wook Heo, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 183 days.

(21) Appl. No.: 15/798,280

(22) Filed: Oct. 30, 2017

(65) Prior Publication Data

US 2019/0011907 A1  Jan. 10, 2019

(30) Foreign Application Priority Data

Jul. 5, 2017  (KR) .................. 10-2017-0085301

(51) Int. Cl.
| | |
|---|---|
| G05D 1/00 | (2006.01) |
| G07C 5/00 | (2006.01) |
| H04L 29/08 | (2006.01) |
| H04W 4/04 | (2009.01) |
| G01S 19/42 | (2010.01) |
| H04B 5/00 | (2006.01) |
| H04W 4/80 | (2018.01) |
| H04W 4/40 | (2018.01) |
| G07C 5/08 | (2006.01) |

(52) U.S. Cl.
CPC ......... *G05D 1/0016* (2013.01); *G05D 1/0022* (2013.01); *G05D 1/0055* (2013.01); *H04L 67/125* (2013.01); *G01S 19/42* (2013.01); *G05D 2201/0213* (2013.01); *G07C 5/008* (2013.01); *G07C 5/0841* (2013.01); *G07C 2209/62* (2013.01); *H04B 5/0031* (2013.01); *H04L 67/12* (2013.01); *H04L 67/26* (2013.01); *H04W 4/046* (2013.01); *H04W 4/40* (2018.02); *H04W 4/80* (2018.02)

(58) Field of Classification Search
CPC ... G05D 1/0016; G05D 1/0022; G05D 1/0055
See application file for complete search history.

(56) References Cited

U.S. PATENT DOCUMENTS

| | | | |
|---|---|---|---|
| 2017/0120846 A1* | 5/2017 | Gupta ................. | B60R 16/023 |
| 2017/0273051 A1* | 9/2017 | Robinson ............ | H04W 4/80 |

* cited by examiner

*Primary Examiner* — Todd M Melton
(74) *Attorney, Agent, or Firm* — Morgan, Lewis & Bockius LLP

(57) ABSTRACT

A vehicle remote control method is/are configured to includes an operation in which, when receiving a remote control signal transmitted via a mobile communication terminal, a vehicle performs a remote control corresponding to the remote control signal, an operation in which the vehicle identifies vehicle state information related to the remote control failure when the remote control is failed, and the vehicle transmits a vehicle state notification and a request whether to perform the remote control after a pre-procedure on vehicle state, to the mobile communication terminal, and an operation in which the vehicle performs the remote control after the pre-procedure on the vehicle state related to the remote control failure, in response to a remote control request signal transmitted from the mobile communication terminal.

19 Claims, 10 Drawing Sheets

VEHICLE REMOTE CONTROL METHOD, AND VEHICLE AND MOBILE COMMUNICATION TERMINAL THEREFOR

CROSS-REFERENCE TO RELATED APPLICATION(S)

The present application claims priority to Korean Patent Application No. 10-2017-0085301, filed on Jul. 5, 2017, the entire contents of which is incorporated herein for all purposes by this reference.

BACKGROUND OF THE INVENTION

Field of the Invention

The present invention relates to a vehicle remote control method and a vehicle and a mobile communication terminal therefor.

Description of Related art

A variety of vehicle additional service devices have been developed and used in a vehicle in consideration with user convenience and safety.

For example, the vehicle additional service device may include a vehicle safety device, e.g., lane departure warning system to maintain a vehicle within a driving lane by assisting a handle operation of a driver when the vehicle travels on a road, and an additional service provider, e.g., a telematics terminal providing a navigation function configured to guide a route to a destination and information related to the route to the destination which is selected by a driver.

The telematics terminal may provide the driver convenience by providing a variety of services, wherein the variety of services includes remote starting of a vehicle, and checking emails via a communication between the telematics terminal and an internal or external configuration of the vehicle.

The information disclosed in this Background of the Invention section is only for enhancement of understanding of the general background of the invention and may not be taken as an acknowledgement or any form of suggestion that this information forms the prior art already known to a person skilled in the art

BRIEF SUMMARY

Various aspects of the present invention are directed to providing a vehicle remote control method and a vehicle and a mobile communication terminal therefore that improves the efficiency of the vehicle remote control service by providing information related to the vehicle remote control, to a user.

Additional aspects of the present invention will be set forth in part in the description which follows and, in part, will be obvious from the description, or may be learned by practice of the present invention.

In accordance with one aspect of the present invention, a vehicle remote control method may include an operation in which, when receiving a remote control signal transmitted via a mobile communication terminal, a vehicle performs a remote control corresponding to the remote control signal; an operation in which the vehicle identifies vehicle state information related to the remote control failure when the remote control is failed, and the vehicle transmits a vehicle state notification and a request whether to perform the remote control after a pre-procedure on vehicle state, to the mobile communication terminal; and an operation in which the vehicle performs the remote control after the pre-procedure on the vehicle state related to the remote control failure, in response to a remote control request signal transmitted from the mobile communication terminal.

The mobile communication terminal may display the vehicle state information notification and the request whether to perform the remote control transmitted from the mobile communication terminal, on a screen.

The vehicle remote control method may further include: an operation in which the vehicle transmits a near field communication terminal detection notification and a request whether to proceed with the remote control, to the mobile communication terminal when the vehicle detects the near field communication terminal before performing the remote control after receiving the remote control signal, wherein the vehicle performs the remote control corresponding to the remote control signal when receiving a remote control continuation request from the mobile communication terminal.

The vehicle remote control method may further include: an operation in which the vehicle transmits a near field communication terminal detection notification, to a telematics service providing server when the vehicle detects the near field communication terminal before performing the remote control after receiving the remote control signal; an operation in which the telematics service providing server requests and receives location information related to the mobile communication terminal to or from the mobile communication terminal; an operation in which the telematics service providing server determines whether the mobile communication terminal and the near field communication terminal are adjacent to each other by comparing the location information related to the mobile communication terminal with the location information related to the vehicle; and an operation in which the telematics service providing server transmits a notification indicating that the near field communication terminal is close, to the vehicle when it is determined that the mobile communication terminal and the near field communication terminal are adjacent to each other according to a result of the determination.

The vehicle remote control method may further include: an operation in which the telematics service providing server transmits a notification indicating that the near field communication terminal is not close, to the vehicle when it is determined that the mobile communication terminal and the near field communication terminal are not adjacent to each other according to a result of the determination; and an operation in which the vehicle transmits the near field communication terminal detection notification and the request whether to proceed with the remote control, to the mobile communication terminal, wherein the vehicle performs the remote control corresponding to the remote control signal when receiving a remote control continuation request from the mobile communication terminal.

When the vehicle does not receive the remote control continuation request from the mobile communication terminal within a predetermined time, or when the vehicle receives a request for rejecting a remote control continuation, the vehicle may terminate the remote control process.

The vehicle state information may include at least one of vehicle door state, trunk state, air conditioning state, hood state, and whether a near field communication terminal is present in a vehicle.

The remote control signal may represent a remote starting request signal.

In accordance with one aspect of the present invention, a vehicle includes a telematics terminal and a vehicle electronic control unit (ECU). The telematics terminal, when receiving a remote control signal transmitted via a mobile communication terminal, is configured to allow a remote control to be performed by transmitting the remote control signal to the vehicle electronic control unit (ECU), and when the remote control is failed, is configured to transmit a vehicle state notification related to the remote control failure and a request whether to perform the remote control after a pre-procedure on vehicle state, to the mobile communication terminal, and is configured to request the remote control to the vehicle ECU after performing the pre-procedure on vehicle state in response to the remote control request signal returned from the mobile communication terminal. The vehicle electronic control unit (ECU) is configured to perform the remote control corresponding to the remote control signal transmitted from the telematics terminal.

In a state in which a plurality of the vehicle ECUs is provided, when the remote control is failed in the vehicle ECU, the telematics terminal may request pre-determined vehicle state table information to the plurality of the vehicle ECUs, respectively, and may transmit only vehicle state information, which is related to the remote control failure among the vehicle state information returned from the each vehicle ECU, to the mobile communication terminal.

When receiving a vehicle state table information request from the telematics terminal, the vehicle ECU may identify vehicle state information corresponding to the vehicle state table.

When receiving a near field communication terminal detection notification, the telematics terminal may transmit the near field communication terminal detection notification and a request whether to proceed with the remote control, and the telematics terminal may proceed with or terminate the remote control according to a replay transmitted from the mobile communication terminal.

When receiving the near field communication terminal detection notification from the vehicle ECU, the telematics terminal may transmit the near field communication terminal detection notification to a telematics service providing server to allow the telematics service providing server to determine whether the mobile communication terminal and the near field communication terminal are adjacent to each other.

The telematics service providing server may determine whether the mobile communication terminal and the near field communication terminal are adjacent to each other by comparing the location information related to the mobile communication terminal with the location information related to the vehicle.

When it is determined that the mobile communication terminal and the near field communication terminal are not adjacent to each other, the telematics terminal may transmit the near field communication terminal detection notification and a request whether to proceed with the remote control, to the mobile communication terminal.

The telematics terminal may transmit the remote control request signal to the vehicle ECU when it is determined that the mobile communication terminal and the near field communication terminal are adjacent to each other.

In accordance with one aspect of the present invention, a mobile communication terminal may include a communicator configured to perform a communication with a vehicle and the outside; an input configured to receive a remote control request and a control request input by a user; a display configured to display vehicle state information transmitted from the vehicle and a variety of information; and a controller configured to transmit the remote control signal to the vehicle according to a user selection and configured to return user selected information related to the remote control failure in the vehicle, to the vehicle.

The controller may set whether to use a vehicle remote control service according to the user selection.

The mobile communication terminal may further include a GPS receiver configured to identify the location of the mobile communication terminal.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
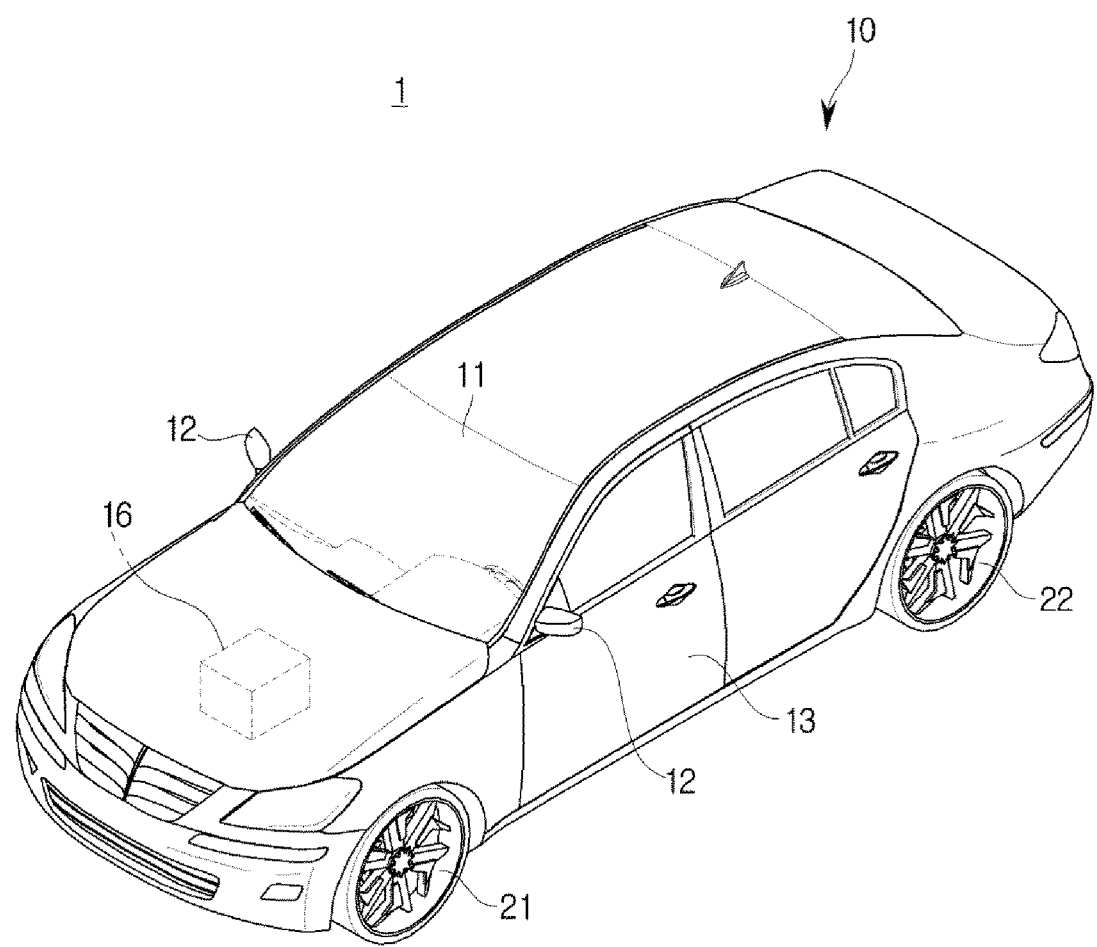
FIG. 1 illustrates an external view of a vehicle.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Like reference numerals refer to like elements throughout the description. Well-known functions or constructions are not described in detail since they would obscure the one or more exemplar embodiments with unnecessary detail. Terms including "unit", "module", "member" and "block" may be embodied as hardware or software. According to embodiments, a plurality of "unit", "module", "member" and "block" may be implemented as a single component or a single "unit", "module", "member" and "block" may include a plurality of components.

It will be understood that when an element is referred to as being "connected" another element, it can be directly or indirectly connected to the other element, wherein the indirect connection includes "connection via a wireless communication network".

Further, when a part "includes" or "comprises" an element, unless there is a particular description contrary thereto, the part may further include other elements, not excluding the other elements.

It will be understood that, although the terms first, second, third, etc., may be used herein to describe various elements, but elements are not limited by these terms.

As used herein, the singular forms "a," "an" and "the" are intended to include the plural forms as well, unless the context clearly indicates otherwise.

An identification code is used for the convenience of the description but is not intended to illustrate the order of each step. The each step may be implemented in the order different from the illustrated order unless the context clearly indicates otherwise.

Reference will now be made in detail to embodiments of the present invention, exemplary embodiments of which are illustrated in the accompanying drawings.

FIG. 1 illustrates an external view of a vehicle.

Referring to FIG. 1, a vehicle 1 includes a body 10 forming an external of the vehicle 1, a windscreen 11 providing a front view of the vehicle 1 to a driver, a side mirror 12 providing a view of a rear side of the vehicle 1 to the driver, a door 13 closing the internal to the vehicle 1 from the outside, and vehicle wheels 21 and 22 moving the vehicle 1 by including a front wheel 21 disposed on a front side of the vehicle and a rear wheel 22 disposed on a rear side of the vehicle.

The windscreen 11 may be provided on an upper portion of the front of the body 10 to allow the driver within the vehicle 1 to acquire visual information related to the front of the vehicle 1. The side mirror 12 may include a left side mirror provided on the left side of the body 10 and a right side mirror provided on the right side of the body 10, and may allow the driver within the vehicle 1 to acquire visual information related to the lateral side and the rear side of the vehicle 1.

The door 13 may be pivotally disposed on a right side and a left side of the body 10. When the door 13 is opened, a driver may be allowed to be accommodated in the vehicle 1, and when the door 13 is closed, the internal to the vehicle 1 may be closed from the outside.

In addition to above mentioned components, the vehicle 1 may include a driving device 16 configured to rotate the vehicle wheels 21 and 22, a steering system configured to change the driving direction of the vehicle 1, and a brake system configured to stop the driving of the vehicle wheels.

The driving device 16 may supply a torque to the front wheel 21 or the rear wheel 22 so that the body 10 may be moved back and forth. The driving device 16 may include an engine generating a torque by burning the fossil or a motor configured to generate a torque by receiving the power from a battery.

The steering system may include a steering wheel 42 (refer to FIG. 2) receiving a driving direction from a driver, a steering gear changing a rotary motion of the steering wheel 42 to a reciprocating motion, and a steering linkage delivering the reciprocating motion of the steering gear to the front wheel 21. Accordingly, the steering system may change the driving direction of the vehicle 1 by changing the direction of the rotary axis of the wheels.

The brake system may include a brake pedal receiving a brake operation from a driver, a brake drum coupled to the wheels 21 and 22, and a brake shoe stopping the rotation of the brake drum by use of friction force. Accordingly, the brake system may stop the driving of the vehicle 1 by stopping the rotation of the wheels 21 and 22.

Figure 2:
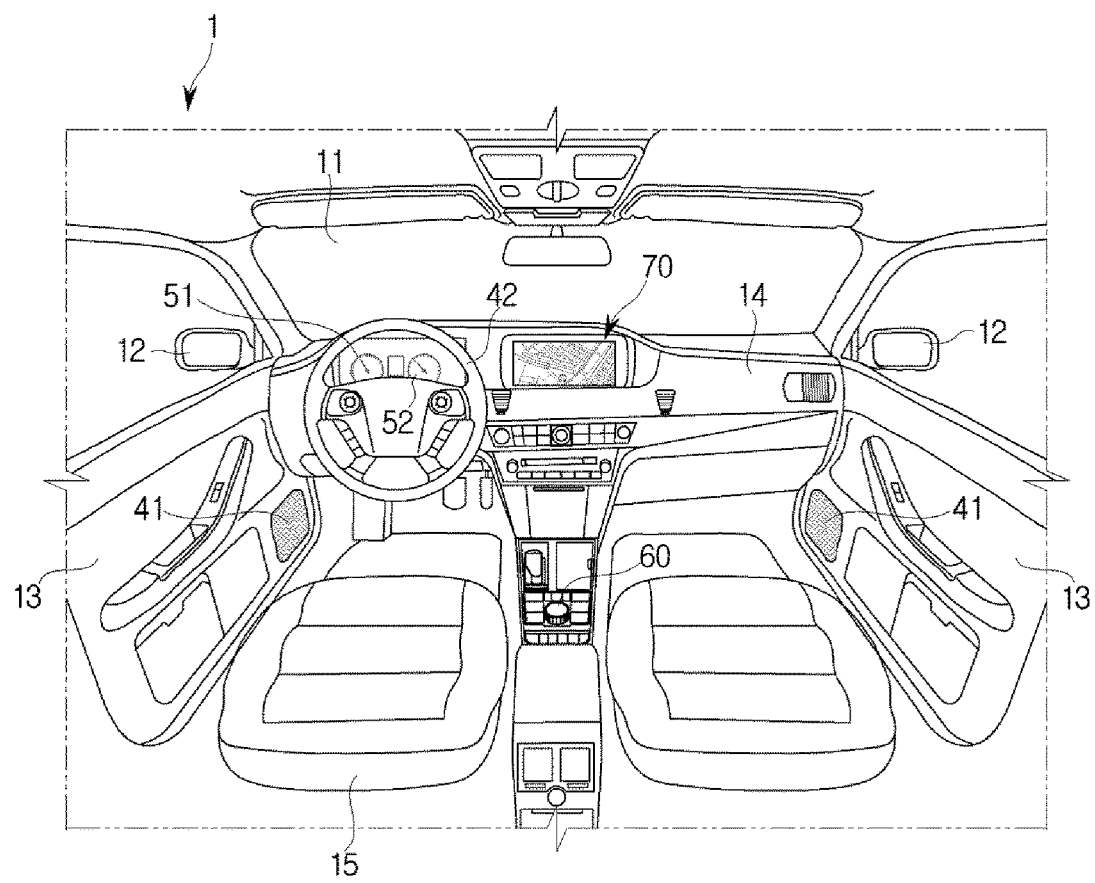
FIG. 2 is a view of an internal of the vehicle.

FIG. 2 is a view of an internal of the vehicle.

The internal of the vehicle 1 may include a dashboard 14 in which a variety of devices are disposed to allow a driver to operate the vehicle 1, a driver seat 15 in which the driver is accommodated, a cluster display 51 and 52 configured to display operation information related to the vehicle 1, and a navigation system 70 configured to perform an audio function and a video function as well as a navigation function guiding a driving route from a departure to a destination in response to an operation command of the driver.

The dashboard 14 may protrude from a lower side of the windscreen 11 to the driver so that the driver may operate a variety of devices disposed in the dashboard 14 while staring at the front.

The driver seat 15 may be provided in a rear side of the dashboard 14 so that the driver may drive the vehicle 1 in a stable position while staring at the front and the variety of devices of the dashboard 14.

The cluster display 51 and 52 may be provided in the driver seat 15 of the dashboard 14 and include a speedometer 51 indicating a driving speed of the vehicle 1 and a revolutions per minute (RPM) gauge 52 indicating a rotation speed of a driving device.

The telematics terminal 70 may include a display displaying road information related to the traveling road of the vehicle 1 or a route to a destination; and a speaker 41 outputting a sound according to an operation command of the driver. In recent, an audio video navigation (AVN) device has been developed so that an audio device, a video device and a navigation device are integrally formed is disposed in a vehicle.

The telematics terminal 70 may provide a variety of services, wherein the variety of services includes a remote starting of a vehicle, and checking emails via a communication between the telematics terminal and the inside or the outside of the vehicle.

The telematics terminal 70 may be disposed in a center fascia. The center fascia may represent a control panel between a driver seat and a passenger seat in the dash board 14, and may represent a portion in which the dash board 14 and a shift lever are vertically joined. In addition, an air conditioning device, a heater controller, a blowing port, a cigar jack, an ashtray, and a cup holder as well as the telematics terminal 70 may be disposed in the center fascia. The center fascia together with a center console may distinguish between the driver seat and the passenger seat.

The vehicle 1 may have an additional jog dial 60 to operate to drive a variety of devices including the telematics terminal 70.

According to an exemplary embodiment of the present invention, the jog dial 60 may perform an operation by being rotated or pressed, and may be provided with a touch pad having a touch recognition are configured to perform a handwriting recognition by use of the user's finger or an additional device having a touch recognition function.

Figure 3:
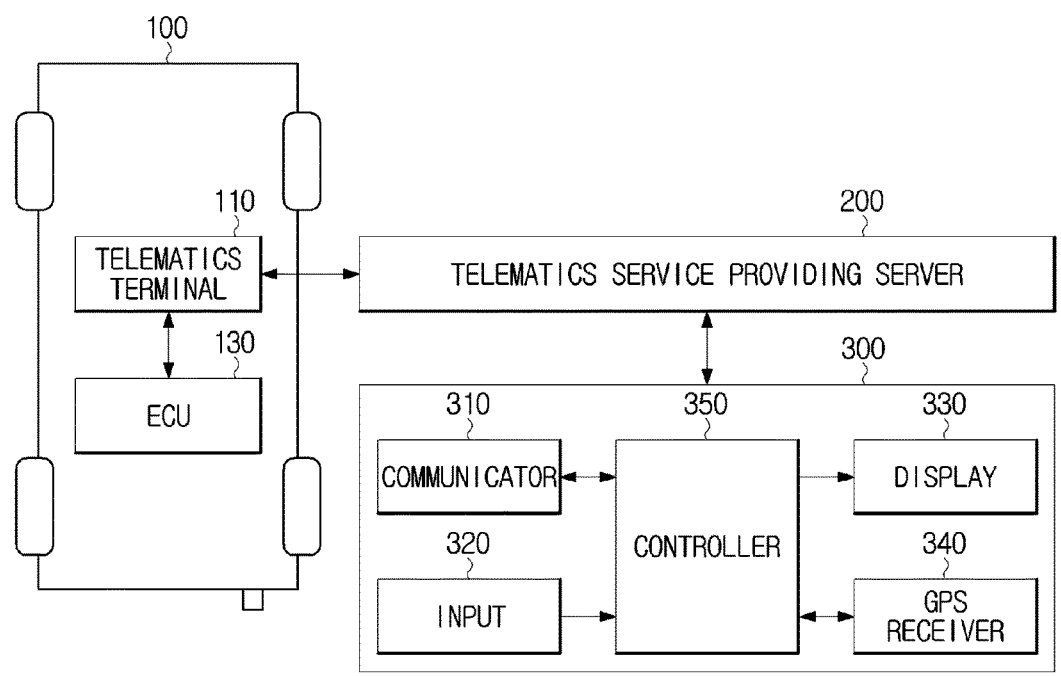
FIG. 3 is a view illustrating a relationship between a telematics service providing server and a mobile communication terminal.

FIG. 3 is a view illustrating a relationship between a telematics service providing server and a mobile communication terminal.

Figure 4:
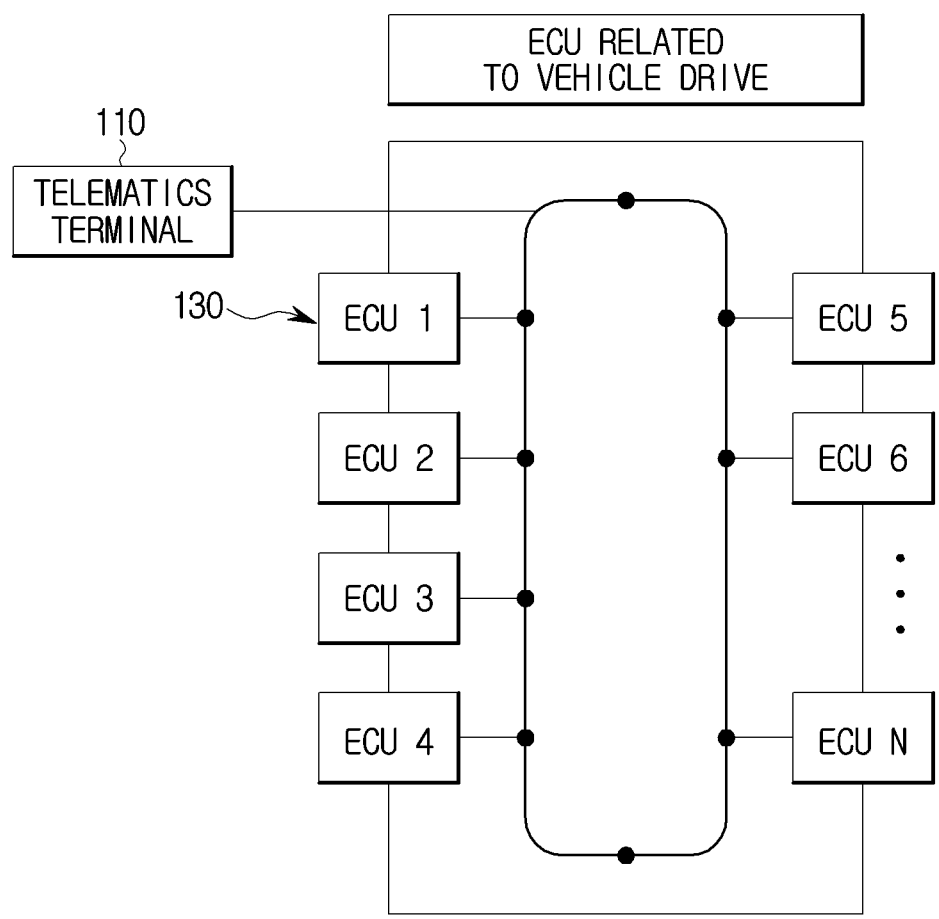
FIG. 4 is a view illustrating a relationship between the telematics terminal and an electronic control unit (ECU).
Figure 5:
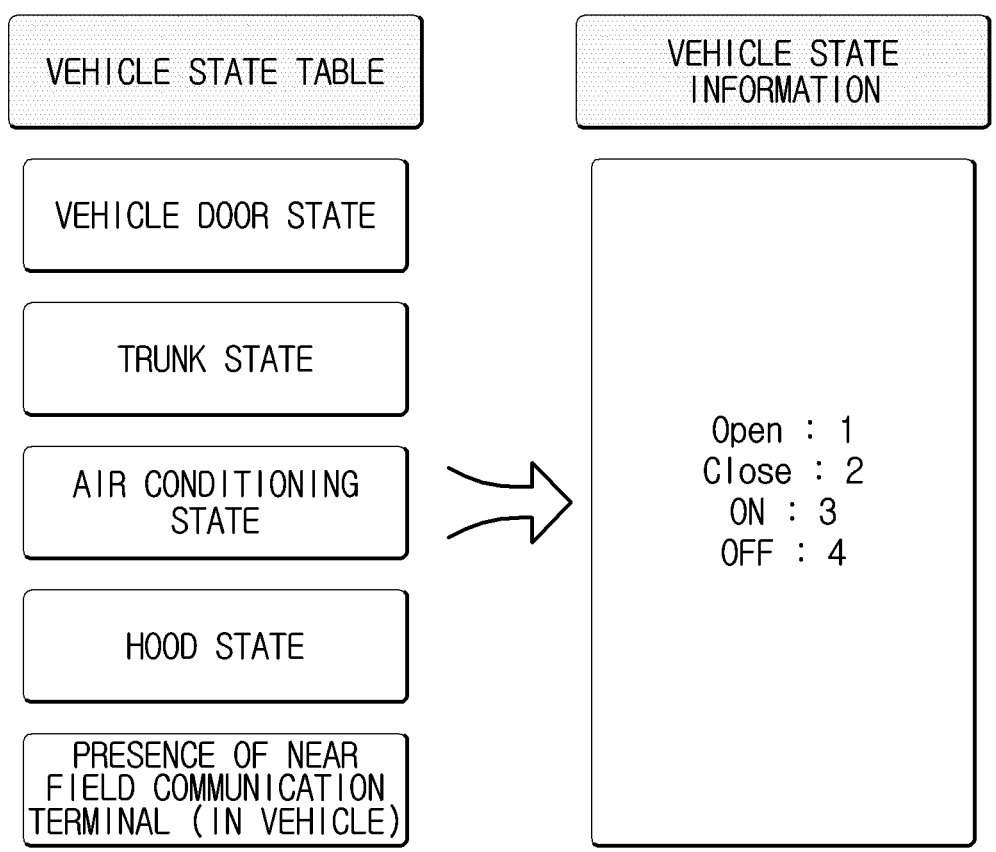
FIG. 5 is a view illustrating an exemplary embodiment of vehicle state table and vehicle state information.
Figure 6:
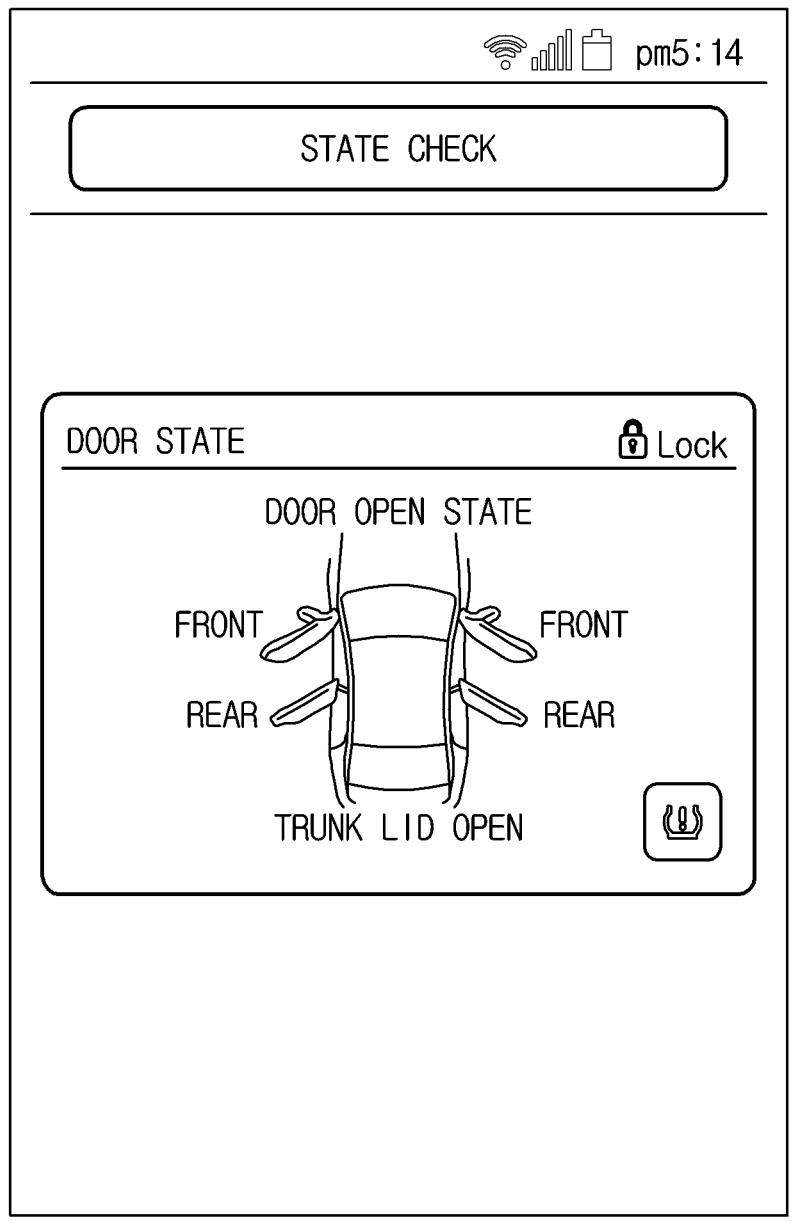
FIG. 6 is a view illustrating an exemplary embodiment of a screen of a mobile communication terminal.
Figure 7:
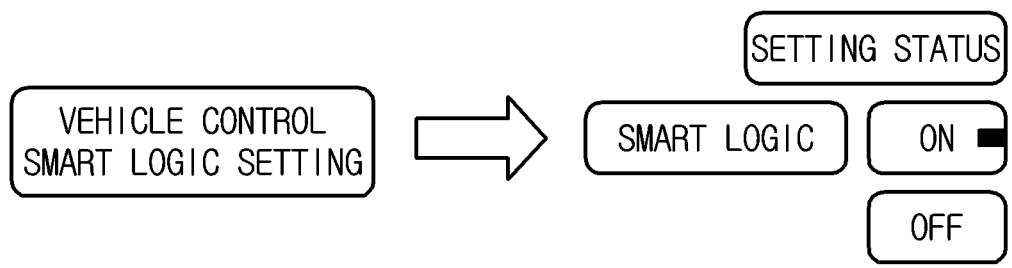
FIG. 7 is a view illustrating a method for setting a vehicle control via a mobile communication terminal.

FIG. 4 is a view illustrating a relationship between the telematics terminal and an electronic control unit (ECU), FIG. 5 is a view illustrating an exemplary embodiment of vehicle state table and vehicle state information, FIG. 6 is a view illustrating an exemplary embodiment of a screen of a mobile communication terminal, and FIG. 7 is a view illustrating a method for setting a vehicle control via a mobile communication terminal. Hereinafter a description thereof will be described with reference to FIG. 4, FIG. 5, FIG. 6, and FIG. 7.

Referring to FIG. 3, the telematics terminal 110 and the mobile communication terminal 300 may send and receive information via a telematics service providing server 200. For this, a wireless communication may be performed between the telematics terminal 110 and the telematics service providing server 200, and between the telematics service providing server 200 and the mobile communication terminal 300. In the present time, the wireless communication may include a short range communication and a radio communication.

A vehicle 100 may include the telematics terminal 110 and a vehicle electronic control unit (ECU) 130.

When receiving a remote control signal via the mobile communication terminal 300, the telematics terminal 110 may transmit the remote control signal to the vehicle ECU 130 to allow the remote control to be performed. When the remote control is failed in the vehicle ECU 130, the telematics terminal 110 may transmit a vehicle state information notification related to the remote control failure and a request whether to perform a remote control after a pre-procedure on the vehicle state, to the mobile communication terminal 300. In response to a remote control request signal transmitted from the mobile communication terminal 300, the telematics terminal 110 may request the remote control to the vehicle ECU 130.

As illustrated in FIG. 4, the vehicle 100 may include a plurality of vehicle ECUs (ECU 1, EUC 2, ECU 3, . . . , ECU N). The plurality of vehicle ECUs 130 each may perform the communication with the telematics terminal 110 via a vehicle internal network.

The vehicle internal network may include Controller Area Network (CAN), FlexRay, Ethernet, and Local Interconnection Network (LIN).

When the remote control is failed in the vehicle ECU 130, the telematics terminal 110 may request pre-set vehicle state table information to the plurality of vehicle ECUs 130, and then the telematics terminal 110 may transmit only vehicle state information, which is related to the remote control failure, among the vehicle state information returned from the vehicle ECU 130, to the mobile communication terminal 300.

The telematics terminal 110, the vehicle ECU 130, the telematics service providing server 200 and the mobile communication terminal 300 may pre-determine vehicle state table and vehicle state information corresponding to the vehicle state table for the remote control service.

Referring to FIG. 5, the vehicle state table may include vehicle door state, trunk state, air conditioning state, hood state, and whether a near field communication terminal is present in a vehicle. The vehicle state information may include at least one of vehicle door state, trunk state, air conditioning state, hood state, and whether a near field communication terminal is present in a vehicle. For example, the vehicle state information may include information, e.g., Open: 1, Close: 2, ON: 3, OFF: 4, about each item of the vehicle state table. The near field communication terminal may represent a terminal configured to perform remote starting of the vehicle 100, and configured to open or close the trunk lid via the short range communication with the vehicle 100, e.g., a smart key, and a fob key.

When the remote control is failed in the vehicle ECU 130, the telematics terminal 110 may transmit vehicle state information which is a cause of the remote control failure, to the mobile communication terminal 300 to allow a pre-procedure to be performed on the vehicle state after a user recognizes the cause. "Pre-procedure on the vehicle state" may represent solving the vehicle state which is a cause of the remote control failure, and the pre-procedure for the vehicle state may be requested by an operation of the mobile communication terminal 300 by a user.

For example, the remote control failure may include a case in which when the remote starting of the vehicle 100 is requested, the remote starting is not performed since a vehicle state condition for the remote starting does not meet, e.g., at least one of doors of the vehicle 100 is opened or a trunk lid is opened.

The telematics terminal 110 may request whether to perform the remote control after the pre-procedure on the vehicle state, to the mobile communication terminal 300 so that the remote control is completed or terminated.

After the remote control is completed, the telematics terminal 110 may transmit the result of the remote control to the mobile communication terminal 300.

In a state in which the pre-procedure on the vehicle state corresponding to the cause of the remote control failure may be automatically set in at least one of the telematics terminal 110 and the mobile communication terminal 300, when the remote control is failed, the telematics terminal 110 may perform the remote control after performing the pre-procedure on the vehicle state and then transmit only the result of the remote control to the mobile communication terminal 300.

Alternatively, when the vehicle ECU 130 detects the near field communication terminal before performing the remote control, the telematics terminal 110 may proceed as follows.

For example, when receiving a near field communication terminal detection notification from the vehicle ECU 130, the telematics terminal 110 may transmit the near field communication terminal detection notification and a request whether to proceed with the remote control, to the mobile communication terminal 300. In response to an answer returned from the mobile communication terminal 300, the telematics terminal 110 may maintain or terminate the remote control.

For another example, when receiving the near field communication terminal detection notification from the vehicle ECU 130, the telematics terminal 110 may transmit the near field communication terminal detection notification to the telematics service providing server 200 to allow the telematics service providing server 200 to determine whether the mobile communication terminal 300 and the near field communication terminal are adjacent to each other.

The telematics service providing server 200 may determine whether the mobile communication terminal 300 and the near field communication terminal are adjacent to each other by comparing the location information related to the mobile communication terminal 300 with the location information related to the vehicle 100. When the near field communication terminal is placed adjacent to a pre-determined detection range, the vehicle ECU 130 may detect the near field communication terminal. In the present time, since the near field communication terminal is detected by the vehicle ECU 130, it may be assumed that the vehicle ECU 130 and the near field communication terminal are adjacent to each other. Accordingly, when the location of the mobile communication terminal 300 is compared with the location of the near field communication terminal, the location information related to the vehicle 100 may be used as the location of the near field communication terminal.

The telematics service providing server 200 may request and receive global positioning system (GPS) location information related to the mobile communication terminal 300 from the mobile communication terminal 300.

When the mobile communication terminal 300 and the near field communication terminal are not adjacent to each other, the telematics terminal 110 may transmit the near field communication terminal detection notification and the request whether to proceed with the remote control, to the mobile communication terminal 300.

When the mobile communication terminal 300 and the near field communication terminal are adjacent to each other, the telematics terminal 110 may transmit the remote control request signal to the vehicle ECU 130.

In response to the remote control signal transmitted from the telematics terminal 110, the vehicle ECU 130 may perform the remote control.

When the vehicle ECU 130 receives the vehicle state table information request from the telematics terminal 110, the vehicle ECU 130 may identify vehicle state information corresponding to the vehicle state table and then return the vehicle state information.

The telematics terminal 110 and the vehicle ECU 130 may be implemented using a memory storing an algorithm for controlling an operation of components in the vehicle 100 and data related to programs implementing the algorithm, and a processor performing the above mentioned operation using the data stored in the memory. The memory and the processor may be implemented in separate chips, or a single chip.

Although not shown in the drawings, the vehicle 100 may further include a communicator, an input, a storage, and a display other than the above mentioned components.

The communicator may include one or more components configured to allow the communication with an external device, wherein the communicator may include at least one of a short range communication module, a wired communication module, and a wireless communication module.

The short-range communication module may include a variety of short range communication modules, which is configured to transmit and receive a signal using a wireless communication module in the short range, e.g., Bluetooth module, Infrared communication module, Radio Frequency Identification (RFID) communication module, Wireless Local Access Network (WLAN) communication module, NFC communications module, and ZigBee communication module.

The wired communication module may include a variety of wired communication module, e.g., Controller Area Network (CAN) communication module, Local Area Network (LAN) module, Wide Area Network (WAN) module, or Value Added Network (VAN) module and a variety of cable communication module, e.g., Universal Serial Bus (USB), High Definition Multimedia Interface (HDMI), Digital Visual Interface (DVI), recommended standard 232 (RS-232), or plain old telephone service (POTS).

The wireless communication module may include a wireless communication module supporting a variety of wireless communication methods, e.g., Radio Data System-Traffic Message Channel (RDS-TMC), Digital Multimedia Broadcasting (DMB), Wifi module, Wireless broadband module, global System for Mobile (GSM) Communication, Code Division Multiple Access (CDMA), Wideband Code Division Multiple Access (WCDMA), Time Division Multiple Access (TDMA), and Long Term Evolution (LTE).

The wireless communication module may include a wireless communication interface having an antenna and a receiver that receive traffic information signals. In addition, the wireless communication module may further include a traffic information signal conversion module for demodulating an analogy wireless signal received via the wireless communication interface, into a digital control signal.

The communication device may further include an internal communication module for the communication among the electronic devices in the vehicle 100. The internal communication protocol of the vehicle 100 may include Controller Area Network (CAN), Local Interconnection Network (LIN), FlexRay, or Ethernet.

The input may include hardware type devices, e.g., a variety of buttons, switches, pedals, keyboards, mouse, track-balls, a variety levers, handles and sticks, for the input by a user.

The input may include software type devices, e.g., Graphical User interface (GUI) including a touch pad for the input by a user. The touch pad may be implemented by Touch Screen Panel (TSP) and thus the touch pad may have a layer structure with the display.

The storage may be implemented using at least one of a non-volatile memory element, e.g., a cache, a Read Only Memory (ROM), a Programmable ROM (PROM), an Erasable Programmable ROM (EPROM), an Electrically Erasable Programmable ROM (EEPROM) and a flash memory, a volatile memory element, e.g., a Random Access Memory (RAM), or a storage medium, e.g., a Hard Disk Drive (HDD) and a CD-ROM. The implementation of the storage is not limited thereto. The storage may be a memory which is implemented by a separate memory chip from the aforementioned processor or the storage may be implemented by a processor and a single chip.

The display may be implemented by Cathode Ray Tube (CRT), Digital Light Processing (DLP) panel, Plasma Display Penal, Liquid Crystal Display (LCD) panel, Electro Luminescence (EL) panel, Electrophoretic Display (EPD) panel, Electrochromic Display (ECD) panel, Light Emitting Diode (LED) panel or Organic Light Emitting Diode (OLED) panel. The implementation of the display is not limited thereto.

Referring to FIG. 3, the mobile communication terminal 300 may include a communicator 310, an input 320, a display 330, a GPS receiver 340 and a controller 350.

The communicator 310 may be a component for the communication with the vehicle 100 and an external device. The communicator 310 may perform the communication with the telematics service providing server 200.

The input 320 may be a component to receive a remote control request as well as a control request from a user.

The display 330 may be a component to display a variety of information as well as the vehicle state information transmitted from the vehicle 100.

Referring to FIG. 6, the display 330 may display the vehicle state information transmitted from the vehicle 100 together with an image corresponding to the vehicle state information to allow a user to recognize the vehicle state information which is a cause of the remote control failure.

The display 330 may display a menu including the remote control continuation request and the result of the remote control, to allow a user to select.

The GPS receiver 340 may be a component to identify the location of the mobile communication terminal 300. The GPS location information related to the mobile communication terminal 300 found out by the GPS receiver 340 may be provided to the telematics service providing server 200.

According to the user selection, the controller 350 may transmit the remote control signal to the vehicle 100 and return the information which is selected by the user and related to the remote control failure.

The controller 350 may set whether to use the remote control according to the user selection.

Referring to FIG. 7, the controller 350 may display a menu "vehicle control smart logic setting" for using the remote control and perform the vehicle control smart by turning on or off "smart logic" which is a sub menu of the menu "remote control smart logic setting". In the present time, 'ON of the smart logic' may represent turning on the remote control and 'OFF of the smart logic' may represent turning off the remote control.

The controller 350 may be implemented using a memory storing an algorithm for controlling an operation of components in the vehicle 100 and data related to programs implementing the algorithm, and a processor performing the above mentioned operation using the data stored in the memory. The memory and the processor may be implemented in separate chips, or a single chip.

Figure 8:
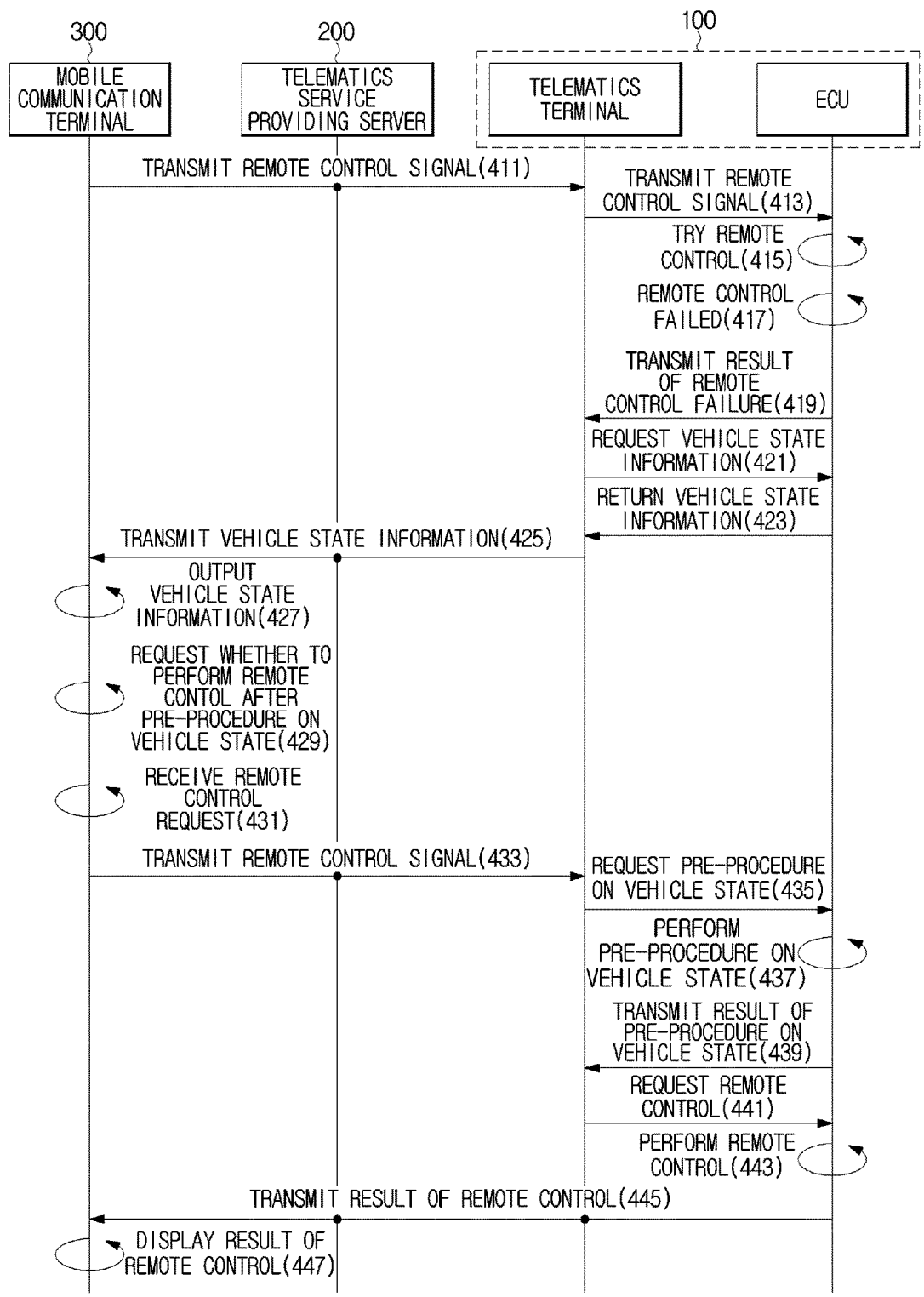
FIG. 8 is a flowchart illustrating a vehicle remote control method of a vehicle in accordance with various exemplary embodiments of the present invention.

FIG. 8 is a flowchart illustrating a vehicle remote control method of a vehicle in accordance with various exemplary embodiments of the present invention.

When receiving a remote control signal via the mobile communication terminal 300, the vehicle 100 may perform the remote control corresponding to the remote control signal. The remote control signal may correspond to a remote starting request signal.

When the telematics terminal 110 of the vehicle 100 receives the remote control signal transmitted from the mobile communication terminal 300 (411), the telematics terminal 110 may transmit the remote control signal to the vehicle ECU 130 which is configured to perform the remote control, among the plurality of the vehicle ECU 130 (413).

When the vehicle ECU 130 tries to perform the remote control, the remote control may be failed since the vehicle state condition does not meet (415 and 417).

The vehicle ECU 130 may transmit the result of the remote control failure to the telematics terminal 110 (419).

When the remote control is failed, the vehicle 100 may determine the vehicle state information related to the remote control failure and transmit the vehicle state information notification and a request whether to perform a remote control after a pre-procedure on the vehicle state, to the mobile communication terminal 300.

When receiving the result of the remote control failure from the vehicle ECU 130 (419), the telematics terminal 110 may request pre-set vehicle state table information to the plurality of vehicle ECUs 130 (421), and then the telematics terminal 110 may transmit only vehicle state information, which is related to the remote control failure, among the vehicle state information returned from the vehicle ECU 130, to the mobile communication terminal 300 (423 and 425).

The telematics terminal 110 may transmit the vehicle state information notification and a request whether to perform a remote control after a pre-procedure on the vehicle state, which is a cause of the remote control failure.

Referring to FIG. 5, the vehicle state table may include vehicle door state, trunk state, air conditioning state, hood state, and whether a near field communication terminal is present in a vehicle. The vehicle state information may include at least one of vehicle door state, trunk state, air conditioning state, hood state, and whether a near field communication terminal is present in a vehicle. For example, the vehicle state information may include information, e.g., Open: 1, Close: 2, ON: 3, OFF: 4, about each item of the vehicle state table. The near field communication terminal may represent a terminal configured to perform the remote starting of the vehicle 100, and configured to open or close the trunk lid via the near field communication with the vehicle 100, e.g., a smart key, and a fob key.

The mobile communication terminal 300 may display the vehicle state information notification and the request whether to perform the remote control, on the screen (427 and 429)

When the remote control request is input by a user, the mobile communication terminal 300 may transmit the remote control signal to the vehicle 100 (431 and 433).

In response to the remote control request signal transmitted from the mobile communication terminal 300, the vehicle 100 may perform the remote control after the pre-procedure on the vehicle state, which is a cause of the remote control failure.

When receiving the remote control signal transmitted from the mobile communication terminal 300, the telematics terminal 110 may transmit a request whether to perform the pre-procedure on the vehicle state, to the vehicle ECU 130 (435). In the present time, the telematics terminal 110 may transmit the request for the pre-procedure on the vehicle state to the vehicle ECU 130 which is a subject to perform the remote control, among the plurality of the vehicle ECU 130.

After performing the pre-procedure on the vehicle state, the vehicle ECU 130 may transmit a result of the pre-procedure on the vehicle state to the telematics terminal 110 (437 and 439).

The telematics terminal 110 may transmit the remote control request transmitted from the mobile communication terminal 300, to the vehicle ECU 130 (441).

After performing the remote control, the vehicle ECU 130 may transmit the result of the remote control to the mobile communication terminal 300 via the telematics terminal 110 to allow a user to recognize the result (443 and 445).

The mobile communication terminal 300 may display the result of remote control on the screen to allow a user to recognize the result (447).

Figure 9:
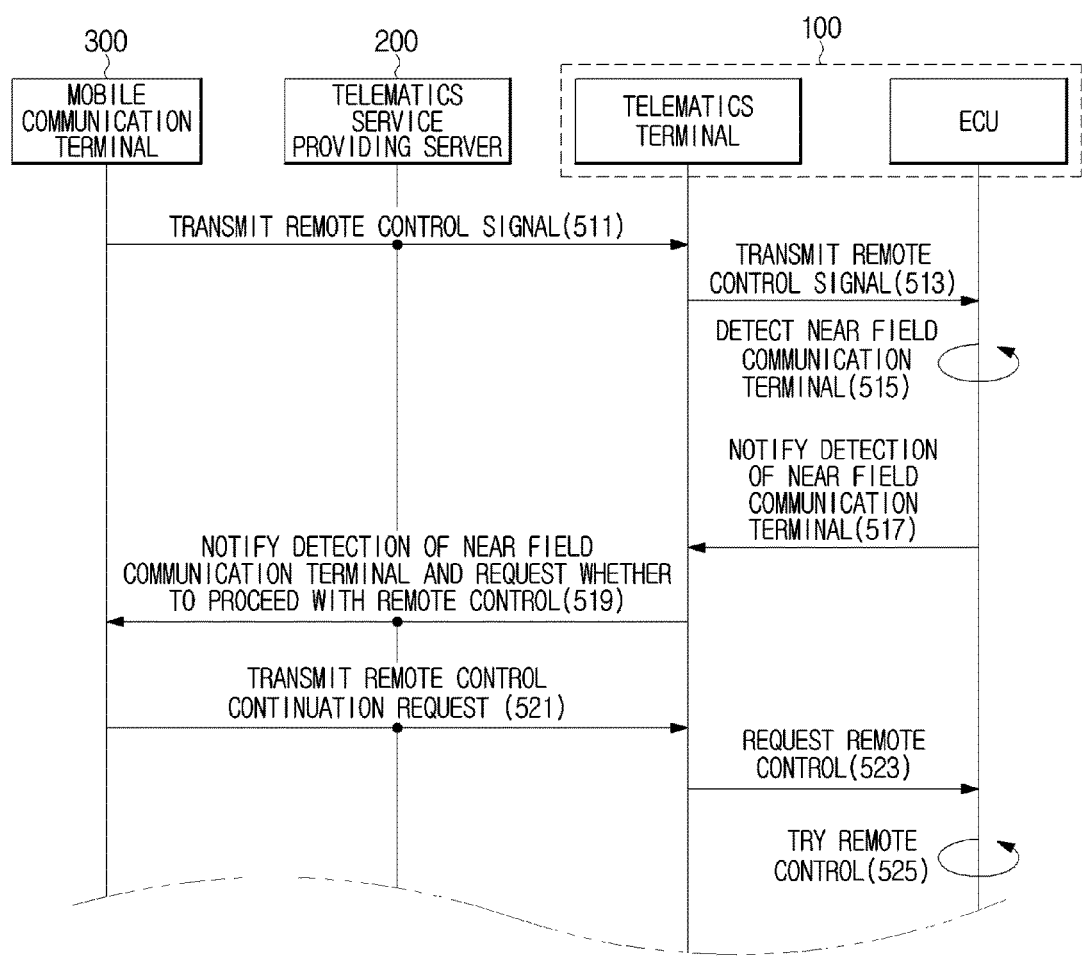
FIG. 9 is a flowchart illustrating a vehicle remote control method of a vehicle in accordance with various exemplary embodiments of the present invention.

FIG. 9 is a flowchart illustrating a vehicle remote control method of a vehicle in accordance with various exemplary embodiments of the present invention.

Hereinafter a case in which the near field communication terminal is detected during the vehicle remote control included in FIG. 8 will be described.

The vehicle 100 may receive a remote control signal via the mobile communication terminal 300.

When receiving the remote control signal transmitted from the mobile communication terminal 300 (511), the telematics terminal 110 of the vehicle 100 may transmit the remote control signal to the vehicle ECU 130 which is a subject to perform the remote control, among the plurality of the vehicle ECU 130 (513).

When the telematics terminal 110 detects the near field communication terminal, the vehicle 100 may transmit the near field communication terminal detection notification and a request whether to proceed with the remote control, to the mobile communication terminal 300. The near field communication terminal may represent a terminal configured to perform the remote starting of the vehicle 100, and configured to open or close the trunk lid via the near field communication with the vehicle 100, e.g., a smart key, and a fob key.

The vehicle ECU 130 may detect the near field communication terminal and then the vehicle ECU 130 may transmit the near field communication terminal detection notification to the telematics terminal 110 (515 and 517).

The telematics terminal 110 may transmit the near field communication terminal and the request whether to proceed with the remote control, to the mobile communication terminal 300 (519).

For example, the step 519 may represent a process of confirming a user 1 at first when the user 1 requests a remote control command in a remote place, to prepare a case in which a user 2 uses the vehicle in practice. It may represent a case in which the user 2, who is another owner of the vehicle, unloads packages while a door or a tailgate is opened after parking, and thus it may be needed to confirm the user 1 before the remote starting.

When receiving a remote control continuation request from the mobile communication terminal 300, the vehicle 10 may perform the remote control in reposed to the remote control signal.

When receiving a remote control continuation request from the mobile communication terminal 300, the telematics terminal 110 may request the remote control to the vehicle ECU 130 which is a subject to perform the remote control (521 and 523).

The vehicle ECU 130 may perform the remote control (525).

Next processes are similar with processes after the step 415 of FIG. 8 performing the remote control, and thus a description thereof will be omitted.

Although not shown in the drawings, when the vehicle 100 does not receive the remote control continuation request from the mobile communication terminal 300 within a predetermined time, or when the vehicle 100 receives a request for rejecting a remote control continuation, the vehicle 100 may terminate the remote control process.

Figure 10:
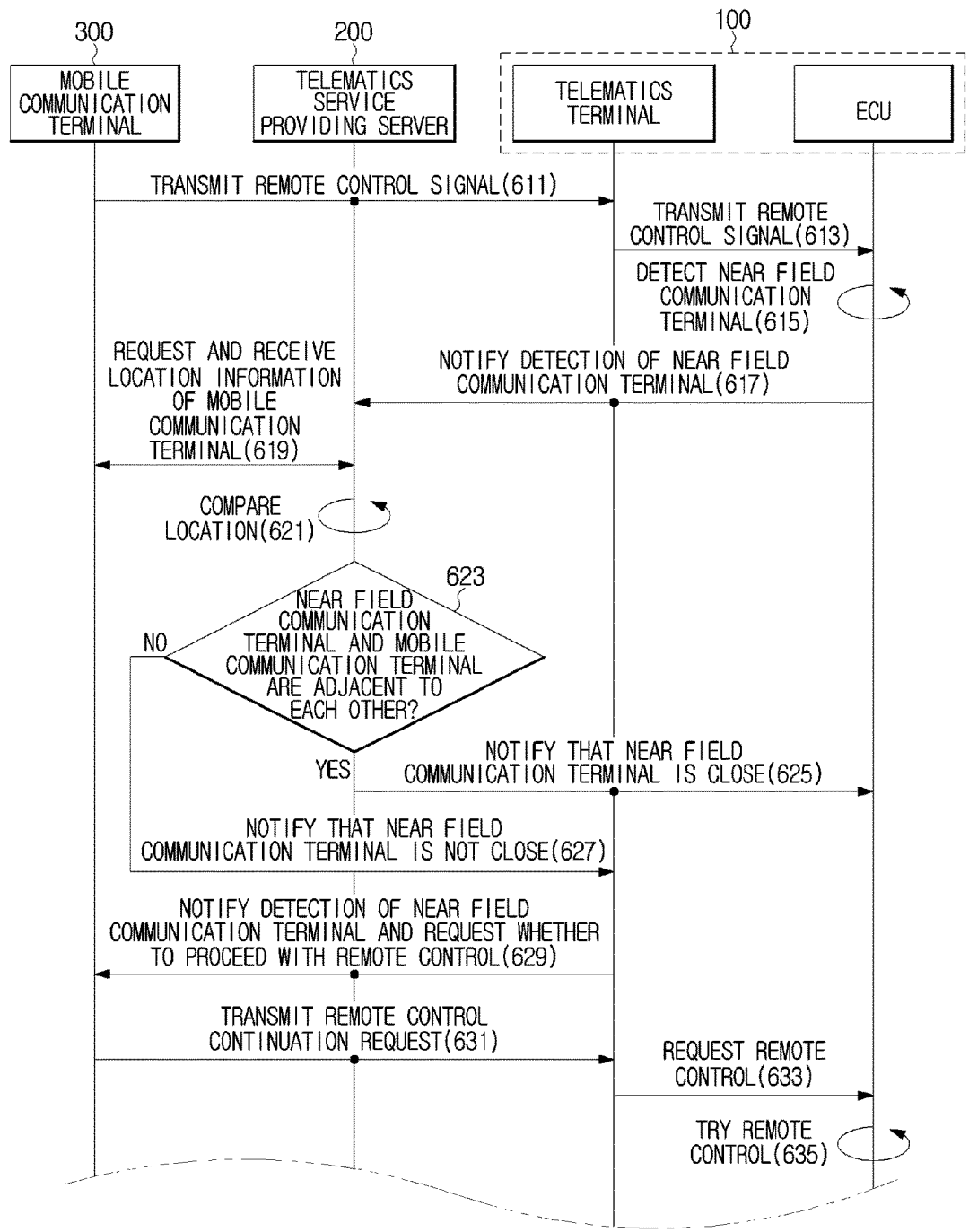
FIG. 10 is a flowchart illustrating a vehicle remote control method of a vehicle in accordance with various exemplary embodiments of the present invention.

FIG. 10 is a flowchart illustrating a vehicle remote control method of a vehicle in accordance with various exemplary embodiments of the present invention.

Hereinafter a case in which the near field communication terminal is detected during the vehicle remote control included in FIG. 8 will be described.

The vehicle 100 may receive a remote control signal via the mobile communication terminal 300.

When receiving the remote control signal transmitted from the mobile communication terminal 300 (611), the telematics terminal 110 of the vehicle 100 may transmit the remote control signal to the vehicle ECU 130 which is a subject to perform the remote control, among the plurality of the vehicle ECU 130 (613).

When the telematics terminal 110 detects the near field communication terminal (615), the vehicle 100 may transmit the near field communication terminal detection notification to the telematics service providing server 200 via the telematics terminal 110 (617). The near field communication terminal may represent a terminal configured to perform the remote starting of the vehicle 100, and configured to open or close the trunk lid via the near field communication with the vehicle 100, e.g., a smart key, and a fob key.

When the near field communication terminal is placed adjacent to a pre-determined detection range, the vehicle ECU 130 may detect the near field communication terminal. In the present time, since the near field communication terminal is detected by the vehicle ECU 130, it may be assumed that the vehicle ECU 130 and the near field communication terminal are adjacent to each other. Accordingly, when the position of the mobile communication terminal 300 is compared with the position of the near field communication terminal, the location information related to the vehicle 100 may be used as the position of the near field communication terminal.

The telematics service providing server 200 may request the location information related to the mobile communication terminal 300 to the mobile communication terminal 300 and then receive the location information related to the mobile communication terminal 300 from the mobile communication terminal 300 (619). Accordingly, the telematics service providing server 200 may determine whether the mobile communication terminal 300 and the near field communication terminal are adjacent to each other, by comparing the location information related to the mobile communication terminal 300 and the location information related to the vehicle 100 (621 and 623). When it is determined that the mobile communication terminal 300 and the near field communication terminal are adjacent to each other according to the result of the determination, the telematics service providing server 200 may transmit a notification indicating that a near field communication terminal is close, to the vehicle 100 (625).

Next processes are similar with processes after the step 415 of FIG. 8 performing the remote control and thus a description thereof will be omitted.

When it is determined that the mobile communication terminal 300 and the near field communication terminal are not adjacent to each other according to the result of the determination of the step 623, the telematics service providing server 200 may transmit a notification indicating that a near field communication terminal is not close, to the vehicle 100 (629).

When receiving the remote control continuation request from the mobile communication terminal 300, the vehicle 100 may perform the remote control in response to the request (631 to 635).

Although not shown in the drawings, when the vehicle 100 does not receive the remote control continuation request from the mobile communication terminal 300 within a predetermined time, or when the vehicle 100 receives a request for rejecting a remote control continuation, the vehicle 100 may terminate the remote control process.

As is apparent from the above description, according to the provided remote control method of a vehicle and vehicle and mobile communication terminal therefor, it may be possible to improve the user satisfaction about the vehicle remote control since a cause of the vehicle remote control failure is provided to allow a user to recognize the cause when the remote control is failed during performing the remote control via the mobile communication terminal, and thus the user may select a methods to resolve the failure.

In addition, it may be possible to increase the success rate of the vehicle remote control.

The exemplary embodiments of the present invention may be implemented in a form of recording media for storing commands to be conducted by a computer. The commands may be stored in a form of program codes, and when executed by a processor, the commands may generate program modules to perform operation in the exemplary embodiments of the present invention. The recording media may correspond to computer-readable recording media.

The computer readable recording media may include various recording medium stored data decrypted by the computer system. For example, there may be a Read Only. Memory (ROM), a Random Access Memory (RAM), a magnetic tape, a magnetic disk, a flash memory, and an optical data storage device. In addition, the medium may be distributed to computer systems over a network, in which computer-readable code may be stored and executed in a distributed manner.

Although a few embodiments of the present invention have been shown and described, it would be appreciated by those skilled in the art that changes may be made in these embodiments without departing from the principles and spirit of the disclosure, the scope of which is defined in the claims and their equivalents.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A vehicle remote control method comprising:
   an operation in which, when receiving a remote control signal transmitted via a mobile communication terminal, a vehicle performs a remote control corresponding to the remote control signal;
   an operation in which the vehicle identifies vehicle state information related to a remote control failure when the remote control is failed, and the vehicle transmits a vehicle state notification and a request whether to perform the remote control after a pre-procedure on vehicle state, to the mobile communication terminal; and
   an operation in which the vehicle performs the remote control after the pre-procedure on the vehicle state related to the remote control failure, in response to a remote control request signal transmitted from the mobile communication terminal.

2. The vehicle remote control method of claim 1, wherein the mobile communication terminal displays the vehicle state information notification and the request whether to perform the remote control transmitted from the mobile communication terminal, on a screen.

3. The vehicle remote control method of claim 1, further including:
   an operation in which the vehicle transmits a near field communication terminal detection notification and a request whether to proceed with the remote control, to the mobile communication terminal when the vehicle detects the near field communication terminal before performing the remote control after receiving the remote control signal, wherein the vehicle performs the remote control corresponding to the remote control signal when receiving a remote control continuation request from the mobile communication terminal.

4. The vehicle remote control method of claim 1, further including:
   an operation in which the vehicle transmits a near field communication terminal detection notification, to a telematics service providing server when the vehicle detects the near field communication terminal before performing the remote control after receiving the remote control signal;
   an operation in which the telematics service providing server requests and receives location information related to the mobile communication terminal to or from the mobile communication terminal;
   an operation in which the telematics service providing server determines whether the mobile communication terminal and the near field communication terminal are adjacent to each other by comparing the location information related to the mobile communication terminal with the location information related to the vehicle; and
   an operation in which the telematics service providing server transmits a notification indicating that the near field communication terminal is close, to the vehicle when the mobile communication terminal and the near field communication terminal are determined to be adjacent to each other according to a result of the determination.

5. The vehicle remote control method of claim 4, further including:
   an operation in which the telematics service providing server transmits a notification indicating that the near field communication terminal is not close, to the vehicle when the mobile communication terminal and the near field communication terminal are determined to not be adjacent to each other according to a result of the determination; and
   an operation in which the vehicle transmits the near field communication terminal detection notification and the request whether to proceed with the remote control, to the mobile communication terminal,
   wherein the vehicle performs the remote control corresponding to the remote control signal when receiving a remote control continuation request from the mobile communication terminal.

6. The vehicle remote control method of claim 5, wherein when the vehicle does not receive the remote control continuation request from the mobile communication terminal within a predetermined time, or when the vehicle receives a request for rejecting a remote control continuation, the vehicle terminates the remote control process.

7. The vehicle remote control method of claim 1, wherein the vehicle state information includes at least one of vehicle door state, trunk state, air conditioning state, hood state, and whether a near field communication terminal is present in a vehicle.

8. The vehicle remote control method of claim 1, wherein the remote control signal represents a remote starting request signal.

9. A vehicle comprising:
   a telematics terminal, when receiving a remote control signal transmitted via a mobile communication terminal, configured to allow a remote control to be performed by transmitting the remote control signal to a vehicle electronic control unit (ECU), and when the remote control is failed, configured to transmit a vehicle state notification related to a remote control failure and a request whether to perform the remote control after a pre-procedure on vehicle state, to the mobile communication terminal, and configured to request the remote control to the vehicle ECU after performing the pre-procedure on vehicle state in a response to the remote control request signal returned from the mobile communication terminal; and the vehicle electronic control unit (ECU) configured to perform the remote control corresponding to the remote control signal transmitted from the telematics terminal.

10. The vehicle of claim 9, wherein in a state in which a plurality of the vehicle ECUs is provided, when the remote control is failed in the vehicle ECU, the telematics terminal requests predetermined vehicle state table information to the plurality of the vehicle ECUs, respectively, and transmits only vehicle state information, which is related to the remote control failure among the vehicle state information returned from the each vehicle ECU, to the mobile communication terminal.

11. The vehicle of claim 10, wherein when receiving a vehicle state table information request from the telematics terminal, the vehicle ECU identifies vehicle state information corresponding to the vehicle state table.

12. The vehicle of claim 9, wherein when receiving a near field communication terminal detection notification, the telematics terminal transmits the near field communication terminal detection notification and a request whether to proceed with the remote control, and the telematics terminal proceeds with or terminates the remote control according to a replay transmitted from the mobile communication terminal.

13. The vehicle of claim 9, wherein when receiving the near field communication terminal detection notification from the vehicle ECU, the telematics terminal transmits the near field communication terminal detection notification to a telematics service providing server to allow the telematics service providing server to determine whether the mobile communication terminal and the near field communication terminal are adjacent to each other.

14. The vehicle of claim 13, wherein the telematics service providing server determines whether the mobile communication terminal and the near field communication terminal are adjacent to each other by comparing location information related to the mobile communication terminal with the location information related to the vehicle.

15. The vehicle of claim 13, wherein when it is determined that the mobile communication terminal and the near field communication terminal are determined to not be adjacent to each other, the telematics terminal transmits the near field communication terminal detection notification and a request whether to proceed with the remote control, to the mobile communication terminal.

16. The vehicle of claim 13, wherein the telematics terminal transmits the remote control request signal to the vehicle ECU when the mobile communication terminal and the near field communication terminal are determined to be adjacent to each other.

17. A mobile communication terminal comprising:

a communicator configured to perform a communication with a vehicle and an outside thereof;

an input configured to receive a remote control request and a control request input by a user;

a display configured to display vehicle state information transmitted from the vehicle and a variety of information; and a controller configured to transmit the remote control signal to the vehicle according to a user selection and configured to return user selected information related to the remote control failure in the vehicle, to the vehicle.

18. The mobile communication terminal of claim 17, wherein the controller is configured to set whether to use a vehicle remote control service according to the user selection.

19. The mobile communication terminal of claim 17 further including:

a GPS receiver configured to identify a location of the mobile communication terminal.

* * * * *